United States Patent [19]
Malloy

[11] Patent Number: 5,926,818
[45] Date of Patent: Jul. 20, 1999

[54] RELATIONAL DATABASE IMPLEMENTATION OF A MULTI-DIMENSIONAL DATABASE

[75] Inventor: William Earl Malloy, Santa Clara, Calif.

[73] Assignee: International Business Machines Corporation, Armonk, N.Y.

[21] Appl. No.: 08/884,696

[22] Filed: Jun. 30, 1997

[51] Int. Cl.[6] .................................................. G06F 17/30
[52] U.S. Cl. .......................................... 707/100; 707/101
[58] Field of Search ............................... 707/3, 205, 506, 707/100, 101

[56] References Cited

U.S. PATENT DOCUMENTS

| | | | |
|---|---|---|---|
| 5,359,724 | 10/1994 | Earle | 707/205 |
| 5,519,859 | 5/1996 | Grace | 707/3 |
| 5,632,009 | 5/1997 | Rao et al. | 707/509 |
| 5,694,608 | 12/1997 | Shostak | 707/506 |

OTHER PUBLICATIONS

Metaphor Business Series, "Examining Corporate and Syndicated Data", Chapter 3: Reporter Workshop, Jan. 1990, pp. 3–1 through 3–66.

Archer Decision Sciences, Inc., Internet article, http://www.strategy.com/dwf/raden/str101.htm, Jan. 1995–1996 (entire document).

Kimball, Ralph, "The Data Warehouse Toolkit: Practical Techniques for Building Dimensional Data Warehouses", Appendix D: "User's Guide for Star Tracker™", published by John Wiley & Sons, Inc., Jan. 1996, pp. 321–366.

*Primary Examiner*—Wayne Amsbury
*Assistant Examiner*—Cheryl Lewis
*Attorney, Agent, or Firm*—Merchant & Gould

[57] ABSTRACT

A method, apparatus, and article of manufacture for using a relational database management system to support on-line analytical processing (OLAP) systems. A multi-dimensional database is represented as a relational schema in the relational database. The multi-dimensional database has one or more dimensions. Each dimension has one or more members. The relational schema includes a fact table and one or more related dimension tables. Additionally, the fact table has a dimension column for all but one of the dimensions of the multi-dimensional database and a value column for each member of the remaining dimension. The fact table also has at least one row that contains values corresponding to the intersection of the members identified by the dimension columns and the members associated with the value columns.

15 Claims, 5 Drawing Sheets

RELATIONAL DATABASE IMPLEMENTATION OF A MULTI-DIMENSIONAL DATABASE

CROSS-REFERENCE TO RELATED APPLICATIONS

This application is related to the following co-pending and commonly-assigned patent applications:

Application Ser. No. 08/885,112, entitled "MAPPING DENSE DATA BLOCKS TO ROWS IN A RELATIONAL DATABASE," filed on same date herewith, pending.

Application Ser. No. 08/885,409, entitled "RELATIONAL DATABASE MANAGEMENT OF MULTI-DIMENSIONAL DATA," filed on same date herewith, pending.

Application Ser. No. 08/884,695, entitled "RELATIONAL DATABASE MODIFICATIONS BASED ON MULTI-DIMENSIONAL DATABASE MODIFICATIONS," filed on same date herewith, allowed.

Application Ser. No. 08/885,417, entitled "RELATIONAL EMULATION OF A MULTI-DIMENSIONAL DATABASE INDEX," filed on same date herewith, pending.

Application Ser. No. 08/885,410, entitled "ATTRIBUTE-BASED ACCESS FOR MULTI-DIMENSIONAL DATABASES," filed on same date herewith, allowed.

all of which applications are incorporated by reference herein.

BACKGROUND OF THE INVENTION

1. Field of the Invention

This invention relates in general to database management systems performed by computers, and in particular, to the use of a relational database management system that supports on-line analytical processing.

2. Description of Related Art

Relational DataBase Management System (RDBMS) software using a Structured Query Language (SQL) interface is well known in the art. The SQL interface has evolved into a standard language for RDBMS software and has been adopted as such by both the American National Standards Institute (ANSI) and the International Standards Organization (ISO).

RDBMS software has typically been used with databases comprised of traditional data types that are easily structured into tables. However, RDBMS products do have limitations with respect to providing users with specific views of data. Thus, "front-ends" have been developed for RDBMS products so that data retrieved from the RDBMS can be aggregated, summarized, consolidated, summed, viewed, and analyzed. However, even these "front-ends" do not easily provide the ability to consolidate, view, and analyze data in the manner of "multi-dimensional data analysis." This type of functionality is also known as on-line analytical processing (OLAP).

OLAP generally comprises numerous, speculative "what-if" and/or "why" data model scenarios executed by a computer. Within these scenarios, the values of key variables or parameters are changed, often repeatedly, to reflect potential variances in measured data. Additional data is then synthesized through animation of the data model. This often includes the consolidation of projected and actual data according to more than one consolidation path or dimension.

Data consolidation is the process of synthesizing data into essential knowledge. The highest level in a data consolidation path is referred to as that data's dimension. A given data dimension represents a specific perspective of the data included in its associated consolidation path. There are typically a number of different dimensions from which a given pool of data can be analyzed. This plural perspective, or Multi-Dimensional Conceptual View, appears to be the way most business persons naturally view their enterprise. Each of these perspectives is considered to be a complementary data dimension. Simultaneous analysis of multiple data dimensions is referred to as multi-dimensional data analysis.

OLAP functionality is characterized by dynamic multi-dimensional analysis of consolidated data supporting end user analytical and navigational activities including:

calculations and modeling applied across dimensions, through hierarchies and/or across members;

trend analysis over sequential time periods;

slicing subsets for on-screen viewing;

drill-down to deeper levels of consolidation;

reach-through to underlying detail data; and rotation to new dimensional comparisons in the viewing area.

OLAP is often implemented in a multi-user client/server mode and attempts to offer consistently rapid response to database access, regardless of database size and complexity. While some vendors have proposed and offered OLAP systems that use RDBMS products as storage managers, to date these offerings have been unsuccessful for a variety of reasons. As a result, there is a need in the art for an enhanced technique for using RDBMS products as storage managers for OLAP systems.

SUMMARY OF THE INVENTION

To overcome the limitations in the prior art described above, and to overcome other limitations that will become apparent upon reading and understanding the present specification, the present invention discloses a method, apparatus, and article of manufacture for using a relational database management system to support on-line analytical processing (OLAP) systems.

According to the present invention, a multi-dimensional database is represented as a relational schema in a relational database. The multi-dimensional database has one or more dimensions. Each dimension has one or more members. The relational schema includes a fact table and one or more related dimension tables. Additionally, the fact table has a dimension column for all but one of the dimensions of the multi-dimensional database and a value column for each member of the remaining dimension. The fact table also has at least one row that contains values corresponding to the intersection of the members identified by the dimension columns and the members associated with the value columns.

An object of the present invention is to emulate a multi-dimensional database using a relational database. Another object of the present invention is to provide a relational database implementation of a multi-dimensional database using a relational schema. Yet another object of the present invention is to map data between the multi-dimensional database and the relational database.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
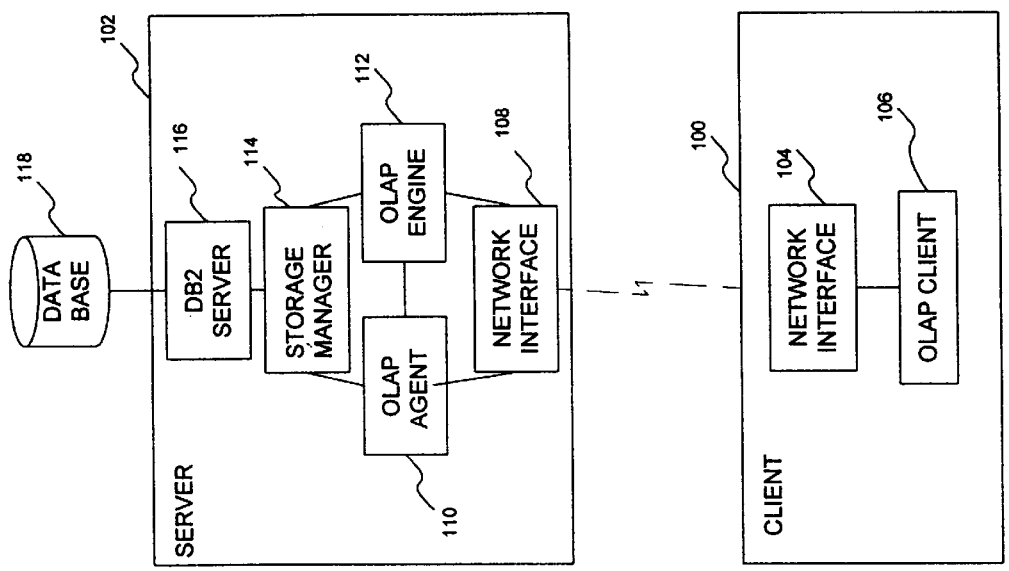
FIG. 1 is a block diagram illustrating an exemplary hardware environment used to implement the preferred embodiment of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention comprises an OLAP system that is designed for a wide-range of multi-dimensional reporting and analysis applications. The OLAP system is based both on Arbor Software's Essbase OLAP software and IBM's DB2 RDBMS software. The present invention utilizes a number of components from Arbor Software's Essbase OLAP system, including components that provide data access, navigation, application design and management and data calculation. However, the present invention comprises new elements that perform database operations, such as storing and retrieving data, for the OLAP system in a relational database. The present invention replaces the integrated multi-dimensional data storage manager of Arbor Software's Essbase OLAP software with a relational database storage manager based on IBM's DB2 RDBMS software. The relational database storage manager enables the OLAP system to store data directly into a relational database.

The relational database utilized by the present invention provides the capacity of industry leading relational databases, and can be managed by familiar RDBMS systems management, backup, and recovery tools. It also offers the advantage of providing access to data using standard SQL (Structured Query Language). In addition, the present invention is designed for applications with very large data volumes. Further, the present invention leverages the existing RDBMS skills of information technology professionals.

The present invention differs from prior art ROLAP (Relational-OLAP) products in significant ways. Prior art ROLAP products, for example, are unsuited for applications which require complex calculations, read/write support, or high numbers of concurrent users. In addition, prior art ROLAP products require extensive support staffs or consultants to develop and deploy applications.

The present invention does not share any of these limitations. Because it integrates Arbor Software's Essbase OLAP software with IBM's DB2 RDBMS software, the present invention provides simplified application design, robust calculation capabilities, and flexible data access coupled with scalability of user access. Significant advantages of the present invention over ROLAP include: performance; automatic table, index and summary management; robust analytical calculations; multi-user read and write access; and security.

With regard to performance, the present invention is designed to deliver consistent, fast response measured in seconds regardless of database size. Prior art ROLAP products measure response time in tens of seconds, minutes or hours.

With regard to automatic table, index and summary management, the present invention automatically creates and manages tables and indices within a star schema in the relational database. The present invention can also populate the star schema with calculated data. Prior art ROLAP products require teams of database architects to manage hundreds or thousands of summary tables manually in order to deliver acceptable end-user performance.

With regard to robust analytical calculations, the present invention is designed to perform high-speed data aggregations (revenue by week, month, quarter and year), matrix calculations (percentages of totals), cross-dimensional calculations (market share and product share) and procedural calculations (allocations, forecasting). Prior art ROLAP products provide less robust calculation capabilities.

With regard to multi-user read and write access, the present invention is designed to support multi-user read and write access which enables operational OLAP applications such as budgeting, planning, forecasting, modeling, "whatif'ing" etc. On the other hand, prior art ROLAP products are read-only.

With regard to security, the present invention is designed to deliver robust data security down to the individual data cell level. Prior art ROLAP products provide no security, or only limited application level security.

The capabilities of the present invention are the same as those of Arbor Software's Essbase OLAP software, including sophisticated OLAP calculations, comprehensive OLAP navigation features, complex database access support and multi-user read/write functionality. In addition, front-end tools, system management tools and applications from Arbor Software and leading third parties will also work with the present invention. Consulting and education companies that have developed expertise with Arbor Software's Essbase OLAP software can immediately apply their experience and knowledge to the present invention.

Although the present specification describes the use of IBM's DB2 RDBMS software, those skilled in the art will recognize that the present invention can use DB2, Oracle, Informix, Sybase, or other RDBMS software, and can run on computers using IBM OS/2, Microsoft Windows NT, IBM-AIX, Hewlett-Packard HP-UX, Sun Solaris, and other operating systems.

Hardware Environment

FIG. 1 is a block diagram illustrating an exemplary hardware environment used to implement the preferred embodiment of the present invention. In the exemplary hardware environment, a client/server architecture is illustrated comprising an OLAP client computer 100 coupled to an OLAP server computer 102. In the exemplary hardware environment, the OLAP client 100 and OLAP server 102 may each include, inter alia, a processor, memory, keyboard, or display, and may be connected locally or remotely to fixed and/or removable data storage devices and/or data communications devices. Each of the computers 100 and 102 also could be connected to other computer systems via the data communications devices. Those skilled in the art will recognize that any combination of the above components, or any number of different components, peripherals, and other devices, may be used with the computers 100 and 102. Those skilled in the art will also recognize that the present invention may be implemented on a single computer, rather than multiple computers networked together.

The present invention is typically implemented using one or more computer programs, each of which executes under the control of an operating system, such as OS/2, Windows, DOS, AIX, UNIX, MVS, etc., and causes the computers 100 and 102 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the computers 100 and 102, cause the computers 100 and 102 to perform the steps necessary to implement and/or use the present invention. Under control of the operating system, the computer programs may be loaded from the memory, data storage devices, and/or data communications devices into the memories of the computers 100 and 102 for use during actual operations. Those skilled in the art will recognize many modifications may be made to this configuration without departing from the scope of the present invention.

In the example illustrated in FIG. 1, the present invention includes a network interface program 104 and an OLAP client program 106 executed by the OLAP client 100, and a network interface program 108, an OLAP agent program 110, an OLAP engine program 112, a storage manager program 114, and a DB2 server program 116 executed by the OLAP server 102. The DB2 server program 116, in turn, performs various data base operations, including search and retrieval operations, termed queries, insert operations, update operations, and delete operations, against one or more relational databases 118 stored on a remote or local data storage device.

The present invention utilizes a number of components from Arbor Software's Essbase OLAP system, including the network interface 104, OLAP client 106, network interface 108, OLAP agent 110, and OLAP engine 112. These components provide data access, navigation, application design and management and data calculation. However, the storage manager 114 and DB2 server 116 comprise new elements that access (e.g., store and retrieve) data for the OLAP system in a relational database.

Conceptual Structure of the Multi-dimensional Database

Figure 2:
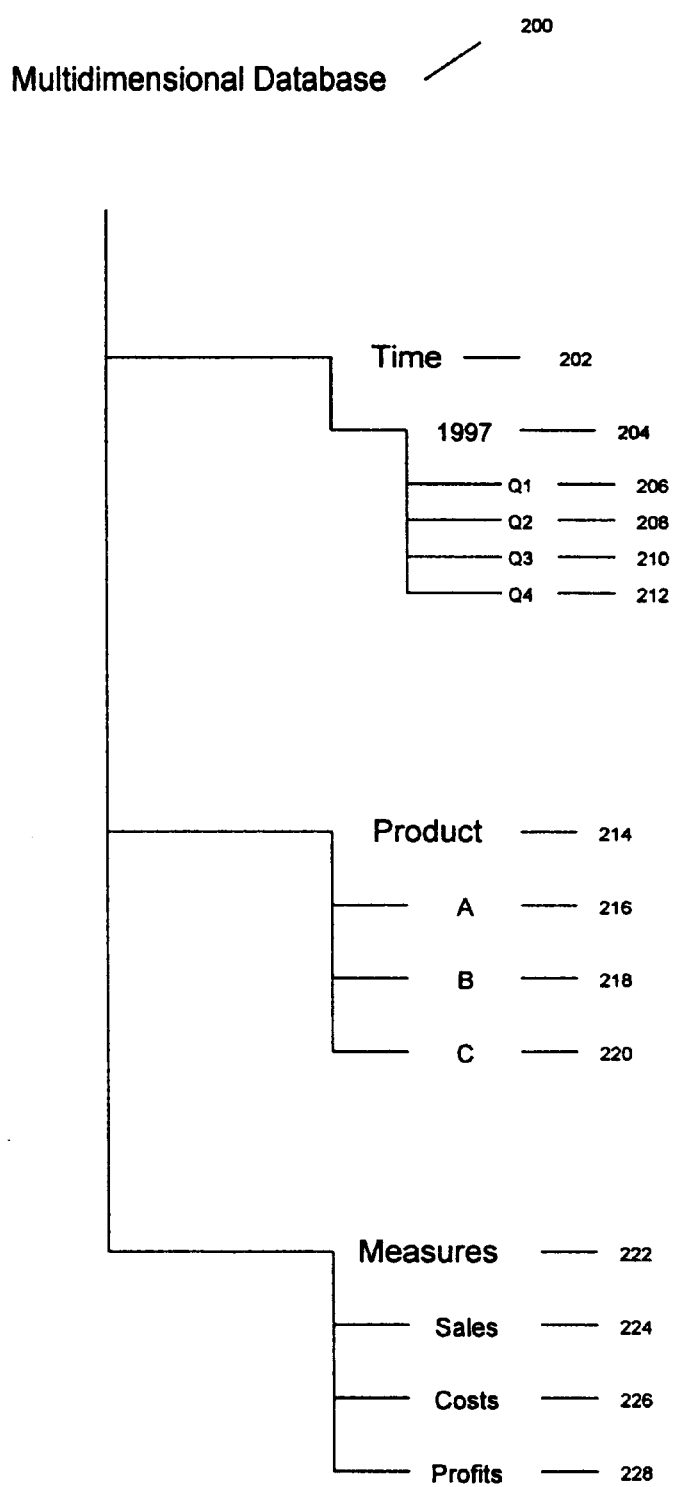
FIG. 2 is a diagram that illustrates the conceptual structure (i.e., an outline) of a multi-dimensional database according to the present invention.

FIG. 2 is a diagram that illustrates the conceptual structure (i.e., an outline) of a multi-dimensional database 200 according to the present invention. A dimension 202, 214, or 222 is a structural attribute that is a list of members, all of which are of a similar type in the user's perception of the data. For example, the year 1997 204 and all quarters, Q1 206, Q2 208, Q3 210, and Q4 212, are members of the Time dimension 202. Moreover, each dimension 202, 214, or 222 is itself considered a member of the multi-dimensional database 200.

Logical Structure of the Multi-dimensional Database

Figure 3:
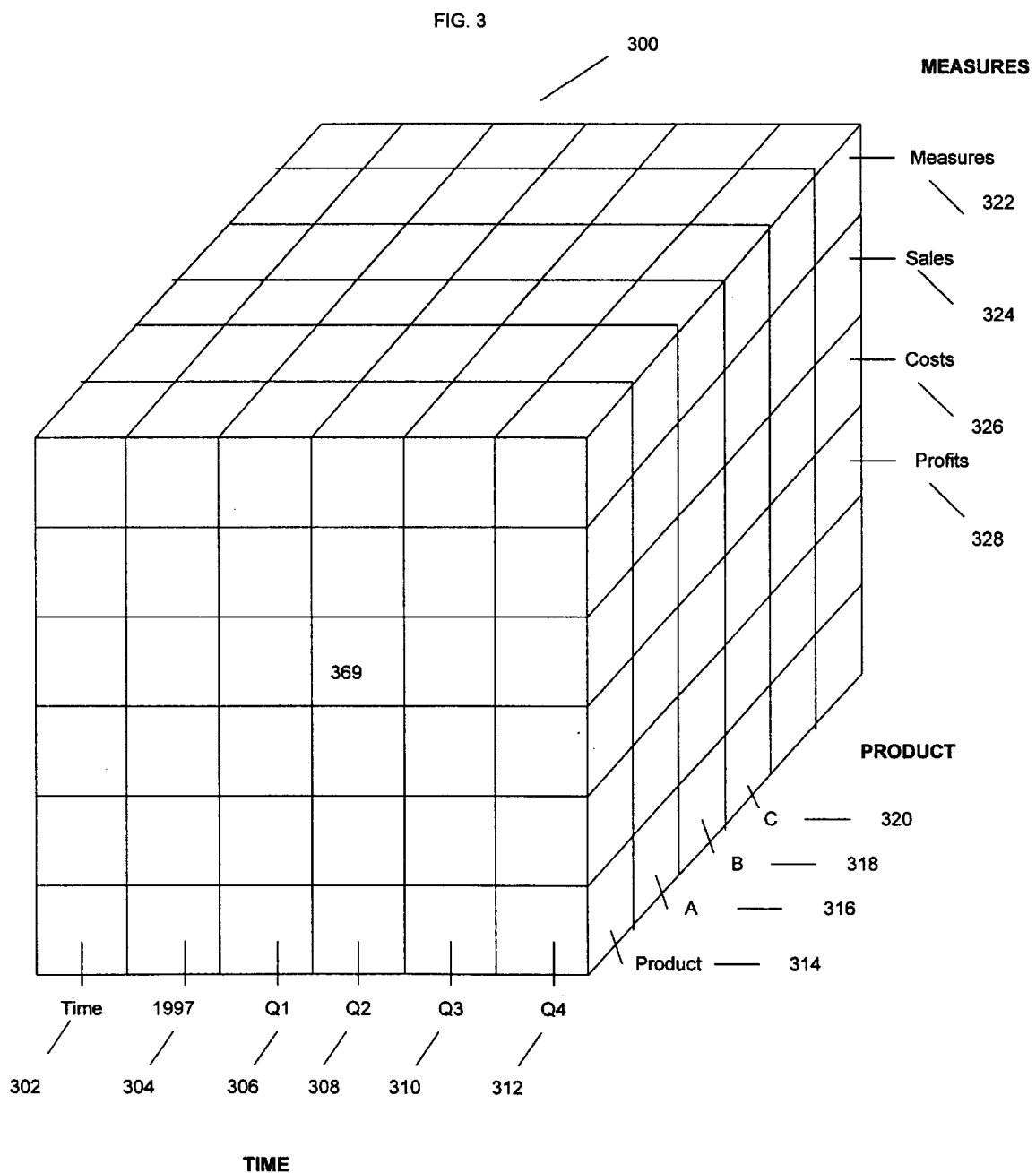
FIG. 3 is a diagram that illustrates the logical structure of a multi-dimensional database according to the present invention.

FIG. 3 is a diagram that illustrates the logical structure of a multi-dimensional database 300 according to the present invention. Generally, the multi-dimensional database 300 is arranged as a multi-dimensional array, so that every data item is located and accessed based on the intersection of the members which define that item. The array comprises a group of data cells arranged by the dimensions of the data. For example, a spreadsheet exemplifies a two-dimensional array with the data cells arranged in rows and columns, each being a dimension. A three-dimensional array can be visualized as a cube with each dimension forming an edge. Higher dimensional arrays (also known as Cubes or Hypercubes) have no physical metaphor, but they organize the data in a way desired by the users.

A dimension acts as an index for identifying values within the Cube. If one member of the dimension is selected, then the remaining dimensions in which a range of members (or all members) are selected defines a sub-cube in which the number of dimensions is reduced by one. If all but two dimensions have a single member selected, the remaining two dimensions define a spreadsheet (or a "slice" or a "page"). If all dimensions have a single member selected, then a single cell is defined. Dimensions offer a very concise, intuitive way of organizing and selecting data for retrieval, exploration and analysis.

A single data point or cell occurs at the intersection defined by selecting one member from each dimension in a cube. In the example cube shown in FIG. 3, the dimensions are Time, Product, and Measures. The cube is three dimensional, with each dimension (i.e., Time, Product, and Measures) represented by an axis of the cube. The intersection of the dimension members (i.e., Time 302, 1997 304, Q1 306, Q2 308, Q3 310, Q4 312, Product 314, A 316, B 318, C 320, Measures 322, Sales 324, Costs 326, and Profits 328) are represented by cells in the multi-dimensional database that specify a precise intersection along all dimensions that uniquely identifies a single data point. For example, the intersection of Q2 308, Product 314 and Costs 326 contains the value, 369, representing the costs of all products in the second quarter of 1997.

Cubes generally have hierarchies or formula-based relationships of data within each dimension. Consolidation involves computing all of these data relationships for one or more dimensions. An example of consolidation is adding up all sales in the first quarter. While such relationships are normally summations, any type of computational relationship or formula might be defined.

Members of a dimension are included in a calculation to produce a consolidated total for a parent member. Children may themselves be consolidated levels, which requires that they have children. A member may be a child for more than one parent, and a child's multiple parents may not necessarily be at the same hierarchical level, thereby allowing complex, multiple hierarchical aggregations within any dimension.

Drilling down or up is a specific analytical technique whereby the user navigates among levels of data ranging from the most summarized (up) to the most detailed (down). The drilling paths may be defined by the hierarchies within dimensions or other relationships that may be dynamic within or between dimensions. For example, when viewing data for Sales 324 for the year 1997 304 in FIG. 3, a drill-down operation in the Time dimension 302 would then display members Q1 306, Q2 308, Q3 310, and Q4 312.

The true analytical power of an OLAP system, however, is evidenced in its ability to evaluate formulae where there are members from more than one dimension. An example is a multi-dimensional allocation rule used in market profitability applications. If for example, the Costs 326 for Product A 316, Product B 318, and Product C 320 are not accounted for separately, but only the Costs 326 for every Product 314 are available, then the Costs 326 for Product A 316, Product B 318, and Product C 320 could be modeled by assuming that they are proportional to sales revenue. The Costs 326 for Product A 316, Product B 318, and Product C 320 could be determined by using the following formulae:

Costs 326 for Product A 316=(Sales 324 for Product A 316)/ (Sales 324 for Product 314)

Costs 326 for Product B 318=(Sales 324 for Product B 318)/ (Sales 324 for Product 314)

Costs 326 for Product C 320=(Sales 324 for Product C 320)/ (Sales 324 for Product 314)

The references to several dimensions within the same rule make it a Cross-Dimensional Formula.

Physical Structure of the Multi-dimensional Database

The physical structure used to store the multi-dimensional data by Arbor Software's Essbase OLAP software is described in U.S. Pat. No. 5,359,724, issued Oct. 25, 1994, to Robert J. Earle, assigned to Arbor Software Corporation, and entitled "METHOD AND APPARATUS FOR STORING AND RETRIEVING MULTI-DIMENSIONAL DATA IN COMPUTER MEMORY", which patent is incorporated by reference herein.

The '724 patent discloses a method for storing and retrieving multi-dimensional data in which a two-level data structure is defined, wherein one level contains those dimensions (i.e., a sub-cube) chosen by the user to result in dense data blocks and the other level contains the remaining dimension combinations that are used as sparse indices (i.e., sparse index keys or dimension identifiers) to select the dense data blocks by identifying dimensions. In particular, a sub-cube of a multi-dimensional database is dense if a relatively high percentage of the possible combinations (i.e., intersections) of dimension members contain data values. The remaining dimensions of the multi-dimensional database are sparse as a relatively high percentage of the possible combinations of their dimension members do not contain data values. These sparse dimensions are used to index the dense datablocks. The total possible number of intersections can be computed by multiplying the number of members in each dimension. The users select the specific dimensions which form the dense data blocks and sparse indices based on their knowledge of the characteristics of the multi-dimensional data.

A sparse index file contains information used to select the dense data blocks. The sparse index file provides an ordering of the blocks and holds data about the age and usage of each block.

Relational Database Structure

Figure 4:
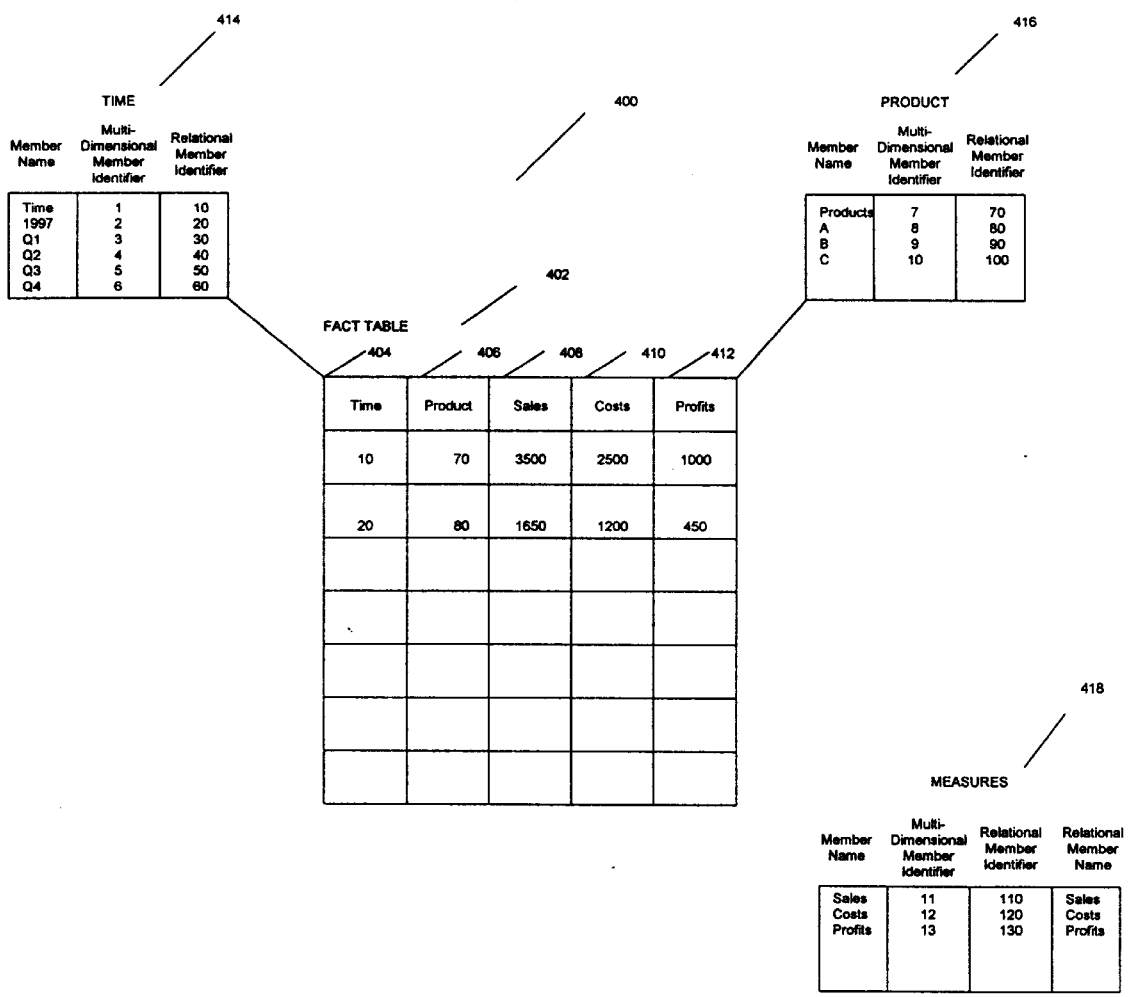
FIG. 4 is a diagram that illustrates a structure for storing multi-dimensional data in a relational database structure according to the present invention.

FIG. 4 is a diagram that illustrates a structure for storing multi-dimensional data in a relational database structure according to the present invention. The present invention stores data in a star schema 400 in the relational database 118, as opposed to a specialized multi-dimensional data store as described in the '724 patent. However, in order to work correctly with Arbor Software's Essbase OLAP software, the storage manager 114 and DB2 server 116 of the present invention work together to emulate the structure and functions performed in the '724 patent, even though a different database is used to store the multi-dimensional data.

In the present invention, the multi-dimensional data is stored in a star schema 400 in the relational database 118. A star schema 400 is a set of relational tables including a main table 402 and related dimension tables 414, 416, and 418, wherein the dimension tables 414 and 416 intersect the main table via common columns, and wherein the dimension table 418 has a column in the main table 402 corresponding to each of its rows. A star schema 400 has several benefits over storing information in traditional RDBMS tables used for on-line transaction processing (OLTP).

Because a star schema 400 is simple, having few tables, it minimizes the complexity required to process database operations. This helps both to speed performance and to ensure correct results of database operations.

Moreover, the use of a star schema 400 is a well known, standard model, and many relational databases 118 have built in optimization for it. By adhering to this standard model, the present invention automatically takes advantage of any such optimization.

In the example of FIG. 4, the boxes represent the base table 402 and dimension tables 414, 416, and 418. The connections between the boxes 402, 414, and 416 represent star joins between tables. The star schema 400 thus comprises the base table, FACT TABLE 402, which is joined to one or more dimension tables, TIME 414 and PRODUCT 416, according to specified relational or conditional operations. The base table FACT TABLE 402 holds data values, while the dimension tables TIME 414, PRODUCT 416, and MEASURES 418 hold member information. As a result, the dimension tables 414, 416, and 418 are relatively small, and the FACT TABLE 402 is usually very large.

The dimension tables TIME 414 and PRODUCT 416 are usually joined to the FACT TABLE 402 with an equivalence condition. In this example of a star schema 400, there are no join conditions between the dimension tables TIME 414, PRODUCT 416, and MEASURES 418 themselves.

In the preferred embodiment, one dimension, called an "Anchor" dimension, is treated differently from the other dimensions, called "non-anchor" dimensions, in that all of its members are mapped to columns in the FACT TABLE 402. For example, in FIG. 4, the MEASURES dimension 418 is the anchor dimension. There is one column in the FACT TABLE 402, SALES 408, COSTS 410, and PROFITS 412, for each member, Sales, Costs, and Profits, of the MEASURES dimension 418. The FACT TABLE 402 also contains one column, TIME 404 and PRODUCT 406, for each other non-anchor dimension, TIME 414 and PRODUCT 416.

Fact Table

In the preferred embodiment of the present invention, there is one FACT TABLE 402 for each Cube. Its purpose is to hold the actual data values of the Cube. In other embodiments, however, more than one FACT TABLE 402 per Cube may be supported to deal with large numbers of members.

The FACT TABLE 402 has a dimension column corresponding to each non-anchor dimension table 414 and 416. The dimension columns of the FACT TABLE 402 hold relational member identifiers and the non-anchor dimension tables 414 and 416 hold the mapping between those relational member identifiers and the member names and multi-dimensional member identifiers. The data values in the FACT TABLE 402 are indexed by the relational member identifiers from each of the dimension columns.

One row in the FACT TABLE 402 contains all data values for a unique combination of members from the different non-anchor dimension tables 414 and 416. Specifically, the dimension columns 404 and 406 contain relational member identifiers corresponding to the multi-dimensional member identifiers, and the member columns 408, 410, and 412 contain data values. For example, the first row in the example of FIG. 4, holds the Sales of 3500, Costs of 2500, and Profits of 1000 for every Product and all Times. Moreover, the second row, in the example of FIG. 4, holds the Sales of 1650, Costs of 1200, and Profits of 450 for Product A during the 1997 Time frame.

The FACT TABLE 402 only holds rows for valid combinations of members from the non-anchor dimensions. So, for example, if a particular product is not sold in a year, there will be no sales, costs or profit figures for any time period for that product in that year. Consequently, the FACT TABLE 402 would not hold any rows for these combinations.

Dimension Tables

As described above, there is one dimension table for each dimension defined in the Cube (i.e., based on the outline). The purpose of the dimension tables is to hold all information relevant to the members of a particular dimension.

Each dimension table contains one row for each member defined in the associated dimension. Note that the dimension name itself is considered to be a member since it represents the top level of the hierarchy for that dimension. The columns are as follows:

MemberName—This is the member name. It is the user-entered name for each member. The value of the MemberName is set to a NULL value if this member is deleted. When a RelMemberId is required, the RelMemberId corresponding to a MemberName which is a NULL value is reused.

RelMemberName—This is the relational member name. It is only used in the Anchor dimension table (because the members from this dimension map to columns in the FACT TABLE 402). This column therefore needs to contain valid relational column names. Therefore, this column may contain member names which have been modified from those stored in MemberName, if necessary.

RelMemberId—This is the relational member identifier. This contains an identifying number for each member used to access data in the relational database. This number is unique within the dimension table. This column is used to 'join' the dimension table to the fact table. Members always retain the same relational member identifier throughout their life time. A relational member identifier may be reused if a member is deleted and another member is created.

MemberId—This is the multi-dimensional member identifier. This contains an identifying number allocated to the member by Essbase. When a Cube definition is altered in Essbase and the Essbase database is restructured, this value may be changed by Essbase. This is a NULL value if MemberName is a NULL value.

The MemberName is typically obtained from the outline. The MemberId is assigned by Arbor Software's Essbase OLAP software and is used by this software to access multi-dimensional data stored in dense data blocks in a multi-dimensional database 300. The RelMemberId is the common column between the non-anchor dimension tables 414 and 416 and the FACT TABLE 402 that is used to join the tables 402, 414, and 416 and is used to access data in the relational database 118 (i.e., FACT TABLE 402). The MemberId, which is used internally by Arbor Software's Essbase OLAP software, maps to the RelMemberId, which is used by the relational database 118 to access data.

Accessing Multi-dimensional Data

To access the multi-dimensional data in the relational database 118, a user interacts with the OLAP client program 106 executed by the OLAP client 100. This interaction results in a request (i.e., command) for a database operation being formed, which is transmitted to the OLAP agent 110 and/or OLAP engine 112 executed by the OLAP server 102 via the network interface programs 104 and 108. The OLAP agent 110 and/or OLAP engine 112 execute functions via the storage manager 114 to access the multi-dimensional data from a data storage manager. In Arbor Software's Essbase OLAP software, data is requested by specifying one or more sparse index keys (i.e., a sparse index key is an encoding of one member from each sparse dimension) that identify one or more dense data blocks in the multi-dimensional database 300.

In the present invention, these sparse index keys comprise combinations of one MemberId for each sparse dimension used internally in Arbor Software's Essbase OLAP software. The storage manager 114 requests the OLAP agent 110 and/or OLAP Engine 112 to decompose the sparse index key into a list of MemberIds. These MemberIds are then mapped to the RelMemberIds used in the relational database 118 via the respective non-anchor dimension tables 414 and 416 in the relational database 118. The resulting rows of the non-anchor dimension tables 414 and 416 are joined to corresponding rows in the FACT TABLE 402. The joined rows of the FACT TABLE 402, which thus meet the criteria of the sparse index keys, are returned by the DB2 server 116 to the storage manager 114. The rows returned have RelMemberIds followed by values for each of the members of the anchor dimension (e.g., the MEASURES dimension 418 in FIG. 4). The storage manager 114 then converts the RelMemberIds into MemberIds and reformats the rows from the FACT TABLE 402 into a "dense data block". The reformatted rows are passed to the OLAP agent 110 and/or OLAP engine 112, which ultimately return the desired data to the OLAP client 106.

In this manner, the relational database 118 can be used to emulate multi-dimensional data in a multi-dimensional database 300. Moreover, by converting between MemberIds of the sparse index keys and RelMemberIds, the DB2 server 116 is able to treat the data in the relational database 118 as dense data blocks for Arbor Software's Essbase OLAP software, while actually maintaining the data in a relational database 118.

In an alternative embodiment, the MemberIds and the RelMemberIds are mapped to each other using two in-memory arrays. The array used to map MemberIds to RelMemberIds has an element for each MemberId containing the corresponding RelMemberId. The array used to map RelMemberIds to MemberIds has an element for each RelMemberId containing the corresponding MemberId. These arrays are generated after the outline is created, and they are re-constructed each time the storage manager 114 initializes or "opens" the multi-dimensional database and after each outline restructure.

In Arbor Software's Essbase model of a multi-dimensional database, the dense data blocks of the multi-dimensional database are ordered by the numerical values of their sparse index keys. In the present invention, the storage manager 114 maintains the ordering of the dense data blocks without actually storing the sparse index keys. Additionally, the storage manager 114 holds data about the age and usage of each dense data block.

Outline Modifications

When the outline is modified, the relational database 118 is modified. In particular, when an outline is changed, Arbor Software's Essbase OLAP software may change the MemberIds for members defined in the outline. When this happens, the MemberIds in the dimension tables 414, 416, and 418 and the FACT TABLE 402 are updated accordingly. When a member is deleted from the outline, the corresponding row of the dimension table 414, 416, or 418 is marked as being available by updating the MemberId and the MemberName to be NULL values. Moreover, when a member is added to the outline, a RelMemberId is sought for the member. A RelMemberId in a table that is available is used (i.e., a RelMemberId corresponding to a MemberName having a NULL value). When no such RelMemberId is available, a new RelMemberId is generated for the newly added member.

Accessing Multi-Dimensional Data From a Relational Database

Figure 5:
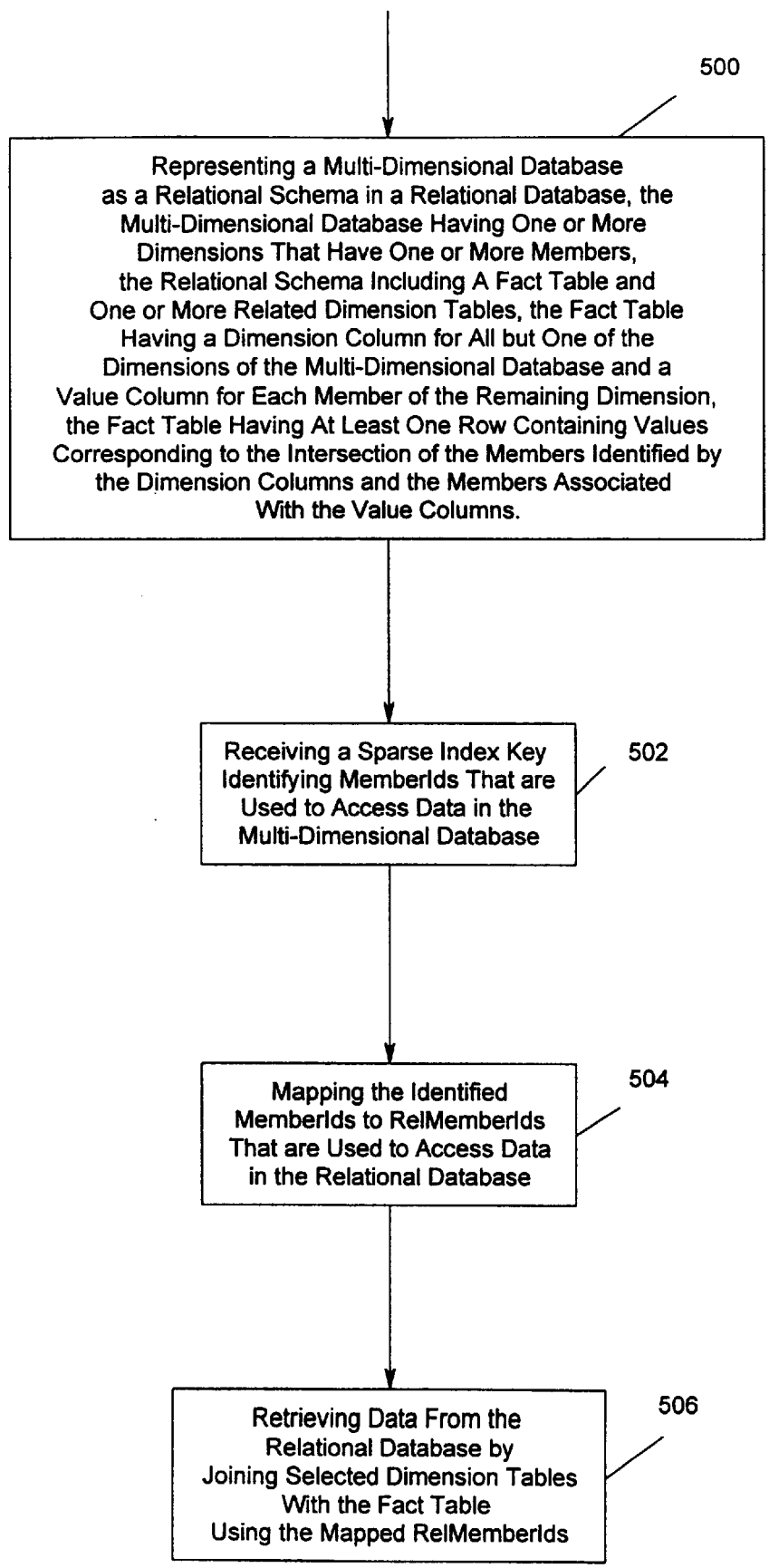
FIG. 5 is a flow diagram illustrating the steps performed to access multi-dimensional data from a relational database according to the present invention.

FIG. 5 is a flow diagram illustrating the steps performed to retrieve multi-dimensional data from a relational database according to the present invention. The steps are performed by the server computer 102, which provides administrative services for accessing data. The client computer 100 provides an interface through which a user can enter a request to access data.

Block 500 represents the server computer 102 representing a multi-dimensional database 300 as a relational schema in a relational database 118. The multi-dimensional database 300 has one or more dimensions having one or more members, and the relational schema includes a FACT TABLE and related dimension tables. The FACT TABLE has a dimension column for all but one of the dimensions of the multi-dimensional database and a value column for each member of the remaining dimension, and the FACT TABLE has at least one row that contains values corresponding to the intersection of the members identified by the dimension columns and the members associated with the value columns. Block 502 represents the server computer 102 receiving a sparse index key that identifies MemberIds, which are used to access data in the multi-dimensional database 300. Block 504 represents the server computer 102 mapping the identified MemberIds to RelMemberIds, which are used to access data in the relational database 118. Block 506 represents the server computer 102 retrieving data from the relational database 118 by joining selected dimension tables with the FACT TABLE using the mapped RelMemberIds.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for using a relational database management system to support on-line analytical processing (OLAP) systems. The present invention emulates a multi-dimensional database using a relational database. Moreover, the present invention provides a relational database implementation of a multi-dimensional database using a star schema. Additionally, the present invention maps data between the multi-dimensional database and the relational database.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a command in a computer to perform a database operation on a relational database stored on a data storage device, the method comprising the step of:

(a) representing a multi-dimensional database as a relational schema in the relational database, wherein the multi-dimensional database has one or more dimensions having one or more members, the relational schema includes a fact table and one or more related dimension tables, with one of the dimension tables being an anchor dimension table that does not intersect the fact table with a common column and the remaining dimension tables being non-anchor dimension tables that intersect the fact table with common columns, the fact table has a dimension column for each of the dimensions of the multi-dimensional database which correspond to the non-anchor dimension tables and a value column for each member of the remaining dimension which corresponds to the anchor dimension table, and the fact table has at least one row that contains values corresponding to the intersection of the members identified by the dimension columns and the members associated with the value columns.

2. The method of claim 1 above, wherein each dimension table has a row for each member of a dimension.

3. The method of claim 2 above, wherein each row of the fact table has a column for every member of a selected dimension.

4. The method of claim 1 above, wherein the multi-dimensional database accesses data using one or more multi-dimensional member identifiers, wherein the relational database accesses data using one or more relational member identifiers, and further comprising the steps of:

receiving a dimension identifier identifying one or more multi-dimensional member identifiers; and mapping the identified multi-dimensional member identifiers to relational member identifiers in the relational database.

5. The method of claim 4 above, further comprising the step of accessing data from the relational database by joining selected dimension tables with the fact table using the relational member identifiers.

6. An apparatus for executing a command to perform a database operation on a relational database, comprising:
   (a) a computer having a data storage device coupled thereto, wherein the data storage device stores the relational database;
   (b) one or more computer programs, performed by the computer, for representing a multi-dimensional database as a relational schema in the relational database, wherein the multi-dimensional database has one or more dimensions having one or more members, the relational schema includes a fact table and one or more related dimension tables, with one of the dimension tables being an anchor dimension table that does not intersect the fact table with a common column and the remaining dimension tables being non-anchor dimension tables that intersect the fact table with common columns, the fact table has a dimension column for each of the dimensions of the multi-dimensional database which correspond to the non-anchor dimension tables and a value column for each member of the remaining dimension which corresponds to the anchor dimension table, and the fact table has at least one row that contains values corresponding to the intersection of the members identified by the dimension columns and the members associated with the value columns.

7. The apparatus of claim 6 above, wherein each dimension table has a row for each member of a dimension.

8. The apparatus of claim 7 above, wherein each row of the fact table has a column for every member of a selected dimension.

9. The apparatus of claim 6 above, wherein the multi-dimensional database accesses data using one or more multi-dimensional member identifiers, wherein the relational database accesses data using one or more relational member identifiers, and further comprising:
   means for receiving a dimension identifier identifying one or more multi-dimensional member identifiers; and
   means for mapping the identified multi-dimensional member identifiers to relational member identifiers in the relational database.

10. The apparatus of claim 9 above, further comprising means for accessing data from the relational database by joining selected dimension tables with the fact table using the relational member identifiers.

11. An article of manufacture comprising a program storage medium readable by a computer and embodying one or more instructions executable by the computer to perform method steps for executing a command to perform a database operation on a relational database stored on a data storage device, the method comprising the step of:
   (a) representing a multi-dimensional database as a relational schema in the relational database, wherein the multi-dimensional database has one or more dimensions having one or more members, the relational schema includes a fact table and one or more related dimension tables, with one of the dimension tables being an anchor dimension table that does not intersect the fact table with a common column and the remaining dimension tables being non-anchor dimension tables that intersect the fact table with common columns, the fact table has a dimension column for each of the dimensions of the multi-dimensional database which correspond to the non-anchor dimension tables and a value column for each member of the remaining dimension which corresponds to the anchor dimension table, and the fact table has at least one row that contains values corresponding to the intersection of the members identified by the dimension columns and the members associated with the value columns.

12. The method of claim 11 above, wherein each dimension table has a row for each member of a dimension.

13. The method of claim 12 above, wherein each row of the fact table has a column for every member of a selected dimension.

14. The method of claim 11 above, wherein the multi-dimensional database accesses data using one or more multi-dimensional member identifiers, wherein the relational database accesses data using one or more relational member identifiers, and further comprising the steps of:
   receiving a dimension identifier identifying one or more multi-dimensional member identifiers; and
   mapping the identified multi-dimensional member identifiers to relational member identifiers in the relational database.

15. The method of claim 14 above, further comprising the step of accessing data from the relational database by joining selected dimension tables with the fact table using the relational member identifiers.

* * * * *